3,231,481
PROCESS FOR CROSS-LINKING HIGH POLYMERS WITH HIGH ENERGY IONIZING IRRADIATION IN THE PRESENCE OF NITROUS OXIDE
Ayao Amemiya, Yoichi Okada, and Takao Ito, Tokyo, Japan, assignors to Sumitomo Bakelite Company Limited, Tokyo, Japan, a corporation of Japan
No Drawing. Filed Nov. 13, 1961, Ser. No. 152,091
Claims priority, application Japan, Nov. 15, 1960, 35/44,881
7 Claims. (Cl. 204—154)

This invention relates to a new and useful method for treating high polymer compounds by an ionizing radiation. More particularly this invention comprises subjecting a high polymer compound to an ionizing radiation to improve the quality of the said high polymer compound.

It is known that exposure of high polymer compounds to an ionizing radiation initiates either cross-linking or decomposition reactions therein. Cross-linking upon such irradiation is characteristic of polyethylene, polystyrene, polypropylene, polyamide, polyester, polyacrylic ester, polyvinyl chloride, natural rubber and synthetic rubber. The decomposition reaction characterizes polymethacrylic ester, polyisobutylene, cellulose and fluoro resin.

It has been known that air or oxygen, if they are present during the irradiation, can remarkably inhibit the cross-linking reaction, and therefore it has been proposed to effect such irradiation in a vacuum or in the atmosphere of an inert gas, such as nitrogen, argon, etc., thereby to insure increased effect of crosslinking. It has also been known that during or after the irradiation, the irradiated high polymer compound may be heated or contacted with a solvent thereby activating the molecular motion of high polymer compound so as to have increased crosslinking effect. Furthermore, the addition of a crosslinking promotor, for example, thiourea or cresol for polyethylene, or diaryl sebacate or triallyl cyanurate for polyvinyl chloride, also has been proposed.

It is one object of the present invention to provide a method for improving the solvent resistance, heat resistance or other properties of a high polymer compound, especially that of the crosslinking type, which comprises subjecting the high polymer compound to the irradiation of an ionizing radiation in the presence of nitrous oxide ($N_2O$).

Another object of the present invention is to provide a method for crosslinking a high polymer compound to the possibly highest degree by the irradiation of an ionizing radiation in an amount as little as possible, while the decomposition of said high polymer compound is suppressed to the possibly lowest degree.

Other objects, features, capabilities and advantages which are comprehended by the present invention will be apparent from the following specification and claims.

According to the present invention, a high polymer compound is subject to the irradiation of an ionizing radiation ray in the presence of nitrous oxide. In this case, the degree of crosslinking of the high polymer compound can be highly increased as compared with that where the irradiation in the same dose amount is effected in vacuo or in the atmosphere of nitrogen or argon instead of nitrous oxide.

In the prior art where the irradiation is effected in vacuum or in the atmosphere of an inert gas with the addition of a previously known crosslinking agent, it was found that the said crosslinking agent is effective to eliminate the crosslinking-inhibiting effect which is raised by the action of oxygen, but the agent has no substantial crosslinking-promoting effect. In contrast, if the irradiation is effected in the presence of nitrous oxide according to the present invention, such crosslinking agent serves not only to eliminate the crosslinking-inhibiting effect but also to promote substantial crosslinking effect. As to the reaction mechanism, it can be assumed that nitrous oxide decomposes by the action of radiation ray to form a free radical or ion which activates the neighboring molecule of the high polymer compound to effect the formation of new crosslinking.

A crosslinking agent which is used heretofore is either liquid or solid, and therefore it must be incorporated into a high polymer compound by means of rollers or the like. In accordance with the present invention, on the other hand, nitrous oxide gas can advantageously diffuse or penetrate with the molecule of a high polymer compound.

High polymer compounds of the crosslinking type, which are usable in a method of the present invention, include all high polymer compounds being capable of crosslinking by the action of an ionizing radiation, e.g. polyethylene, polypropylene, polyamide, polyester, polyacrylic ester, polyvinyl chloride, natural rubber and synthetic rubber. These high polymer compounds may be in any desired shape, such as film, sheet, rod, tube and others.

Ionizing radiation which includes used herein is gamma rays, X-rays, electron-beams or other by high energy radiation. Suitable exposure dosages may be from $1 \times 10^6$ roentgens to $1 \times 10^9$ roentgens.

It may be permissible for the nitrous oxide atmosphere which is employed herein to include a little amount of an inert gas, e.g. nitrogen, argon or the like. However, the presence of a free radical scavenger like oxygen must be avoided to the possibly highest degree. The allowable limit of such free radical scavenger may be less than 10% based on the volume of the total atmosphere.

As to the irradiation conditions, they are not particularly limited. As shown in the following examples, however, higher temperature is preferable because it can accelerate crosslinking reaction, and higher pressure of nitrous oxide also is preferable.

EXAMPLE 1

Low density polyethylene film with a thickness of 0.03 mm. is subjected to the irradiation of $Co^{60}$ $\gamma$-ray at 20° C. in the presence of nitrous oxide gas under a pressure of 600 mm. Hg. The degree if crosslinking of this film is determined by extracting the film with xylene at 80° C. for 15 hours and measuring the undissolved portion. For reference, swelling ratio is also measured. The experiment is repeated under the same conditions excepting that a vacuum of $10^{-4}$ mm. Hg is used instead of the nitrous oxide atmosphere. The results of both experiments are shown for comparison in the following table.

Table 1

| Radiation dosage (roentgens) | Percent gel fraction | | Percent swelling ratio | |
|---|---|---|---|---|
| | Vacuum | $N_2O$ | Vacuum | $N_2O$ |
| 0 | 0 | 0 | | |
| $8 \times 10^6$ | 63.6 | 65.5 | 847 | 714 |
| $2 \times 10^7$ | 74.3 | 82.4 | 742 | 555 |
| $5 \times 10^7$ | 87.3 | 95.0 | 474 | 428 |

EXAMPLE 2

Polystyrene film, 0.1 mm. thick, and polystyrene rod, 1 cm. diameter, are subjected to the radiation of $Co^{60}$ gamma ray in the presence of nitrous oxide at 20° C. under a pressure of 600 mm. Hg. The degree of crosslinking is determined by measuring undissolved materials after the extraction of said film or rod with boiling benzene for 15 hours. For comparison, the same experiment is repeated, but a vacuum of $10^{-4}$ mm. Hg is employed instead of the nitrous oxide atmosphere. The result of both experiments will be seen in the following table.

*Table 2*

| Radiation dosage (roentgens) | Film | | Rod | |
|---|---|---|---|---|
| | Vacuum | N₂O | Vacuum | N₂O |
| 0 | 0 | 0 | 0 | 0 |
| 5×10⁷ | 47 | 51 | 97 | 97 |
| 1×10⁸ | 75 | 82 | 97 | 97 |
| 2×10⁹ | 75 | 84 | 98.5 | 98.5 |

EXAMPLE 3

Raw rubbert sheet, 1 mm. thick, is irradiated with 2 mev. electron-beams in a dose amount of $5 \times 10^6$ roentgens at 20° C. The degree of crosslinking is determined by measuring the percentage of insoluble materials after the extraction with boiling benzene for 15 hours. Nitrous oxide gas pressure is kept at 600 mm. Hg in each case. The results obtained are set forth in the following table.

*Table 3*

| | Percent, Gel fraction | |
|---|---|---|
| | Vacuum | N₂O |
| Natural rubber | 86.5 | 94.1 |
| Styrene-Butadiene rubber | 26.4 | 36.2 |
| Neoprene | 60.3 | 67.8 |

EXAMPLE 4

Nylon sheet, 0.085 mm. thick, is irradiated with an electron-beams in a dose amount of $2 \times 10^8$ roentgens and then immersed in para-cresol at 90° C. The change in length of this sample is determined by measuring the length before and after the immersion. The irradiation in vacuum causes elongation of about 2.4 times its original length, while that in the nitrous oxide atmosphere (600 mm. Hg) causes elongation of at most 2.0 times.

EXAMPLE 5

Atactic polypropylene mass is irradiated with $Co^{60}$ gamma ray in a dose amount of $7.0 \times 10^7$ roentgens at 20° C. After the irradiation, the said mass is immersed in toluene to determine the percentage of insoluble part as gel fraction. Nitrous oxide gas pressure is 600 mm. Hg.

*Table 4*

Gel fraction, percent
Nitrous oxide _____ 53.5
Vacuum _____ 46.3

EXAMPLE 6

Low density polyethylene film, 0.03 mm. thick, is irradiated with gamma ray of $Co^{60}$ in a dose amount of $2 \times 10^7$ roentgens in the presence of nitrous oxide under a pressure of 600 mm. Hg at various temperatures. The degree of crosslinking is determined by measuring the insoluble part as gel fraction after the extraction of the film with xylene at 80° C. for 15 hours. For comparison, the same experiment is repeated but a vacuum of $10^{-4}$ mm. Hg is employed. The results are set forth in the following table.

*Table 5*

| Temp. | Percent, Gel fraction | |
|---|---|---|
| | Vacuum | N₂O |
| −80° C | 64.2 | 70.6 |
| −40° C | 69.7 | 76.3 |
| 20° C | 74.3 | 82.4 |
| 60° C | 80.1 | 87.6 |
| 100° C | 83.6 | 92.2 |

EXAMPLE 7

Low density polyethylene film, 0.3 mm. thick, is irradiated with gamma ray in a dose amount of $2 \times 10^7$ roentgens in the presence of nitrous oxide under various pressures. The degree of crosslinking is determined in the same manner as in Example 6. The higher the pressure is, the higher crosslinking effect is observed.

*Table 6*

Pressure (N₂O), mm. Hg:     Gel fraction, percent
0 _____ 74.3
100 _____ 76.5
600 _____ 82.4
2000 _____ 86.2
4000 _____ 88.8

What we claim is:
1. A process for increasing the cross-linking in a high-molecular weight polymer capable of being cross-linked by exposure to high energy ionizing radiation which comprises irradiating the polymer by high-energy ionizing radiation with a dosage in the range of from $1 \times 10^6$ to $1 \times 10^9$ roentgens in the presence of a catalytic amount of gaseous nitrous oxide catalyst.
2. A process according to claim 1 in which the high-molecular weight polymer is a member of the group consisting of polyamides, polyesters, rubber, polyolefines, polystyrene, polyvinyl chloride and polyacrylic ester.
3. The process according to claim 1 in which the polymer is polystyrene.
4. The process according to claim 1 in which the polymer is nylon.
5. The process according to claim 1 in which the polymer is polyethylene.
6. The process according to claim 1 in which the polymer is polypropylene.
7. The process according to claim 1 in which the polymer is rubber.

References Cited by the Examiner
UNITED STATES PATENTS
2,715,077   8/1955   Wolinski _____ 204—162
2,992,173   7/1961   Ruskin _____ 204—154
3,001,922   9/1961   Zimm.
3,021,269   2/1962   Miller _____ 204—154

OTHER REFERENCES
Martin: Chemical and Engineering News, April 4, 1955, vol. 33, No. 14, pp. 1424–1428.

MURRAY TILLMAN, *Primary Examiner.*